Aug. 11, 1931.  W. M. MOORE  1,818,344
HOT PAN HOLDER
Filed Aug. 18, 1930
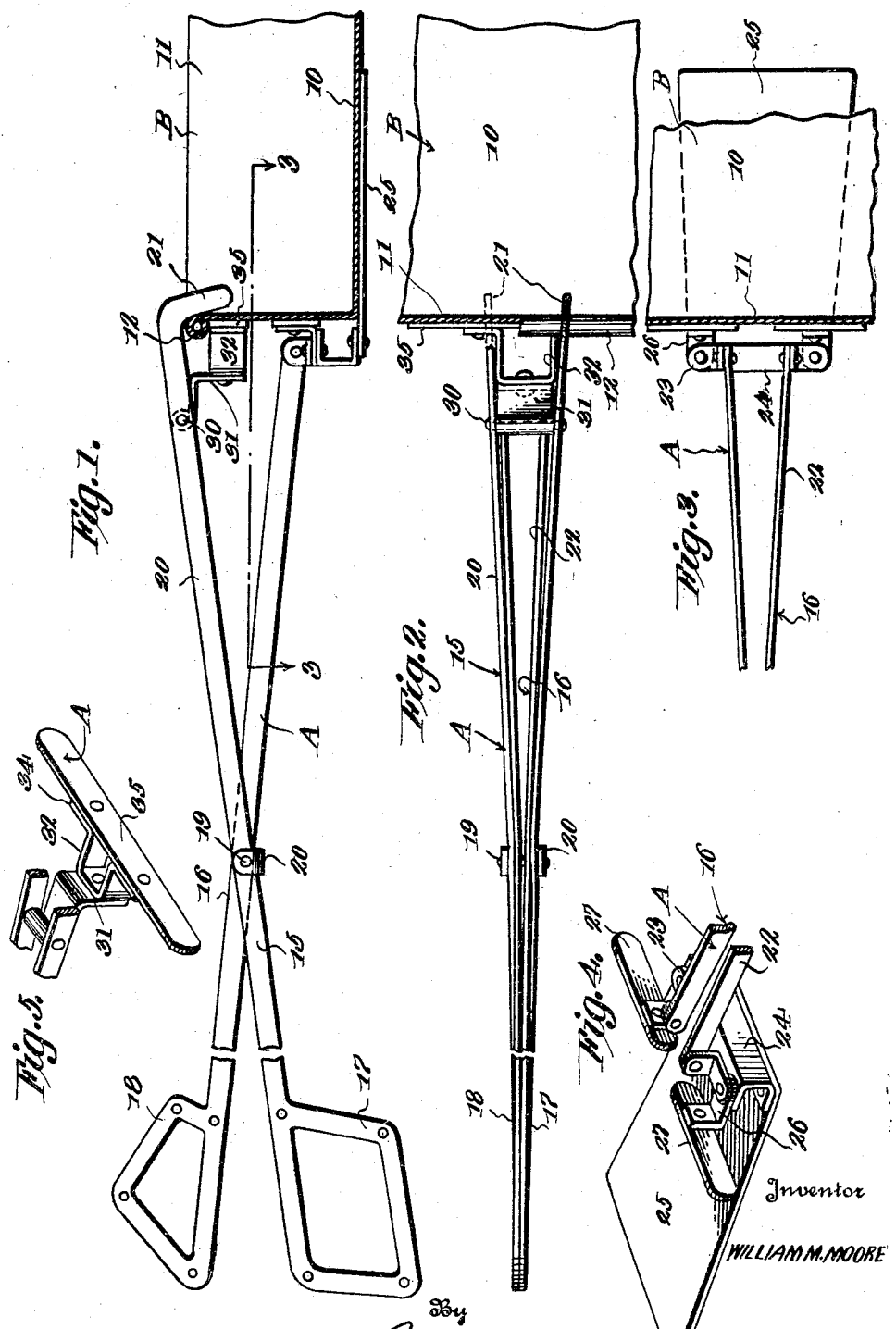
Inventor
WILLIAM M. MOORE
Attorney Patented Aug. 11, 1931

1,818,344

UNITED STATES PATENT OFFICE

WILLIAM MATHEW MOORE, OF LITTLE ROCK, ARKANSAS

HOT PAN HOLDER

Application filed August 18, 1930. Serial No. 476,160.

This invention appertains to culinary appliances and more particularly to a novel device for handling hot pans so as to prevent a person from becoming burned incident to the handling of such pans.

One of the primary objects of my invention is to provide a novel extension handle having means thereon for firmly grasping a hot pan whereby the same can be conveniently removed from a stove without danger to the operator, said grasping means embodying a supporting plate for engaging under the pan and hook members for engaging over the upper edge of the pan.

Another salient object of my invention is the provision of a hot pan lifter embodying a pair of pivotally connected crossed handles, one of the handles having associated therewith in a novel manner the plate for engaging under the pan and the other handle having associated therewith the depending hook for engaging over the upper edge of the pan, the last mentioned plate having associated therewith in a novel manner and in a predetermined arrangement relative to the hook, a steadying plate for engaging the outer surface of the pan, said steadying plate preventing the swinging movement of the pan on the lifter.

A still further object of my invention is to provide an improved hot pan lifter of the above character, which will be durable and efficient in use, one that will be simple and easy to manufacture, and one which can be placed upon the market at a reasonable cost.

With these and other objects in view, the invention consists in the novel construction, arrangement and formation of parts, as will be hereinafter more specifically described, claimed, and illustrated in the accompanying drawings, in which drawings:—

Figure 1 is a side elevation of my improved hot pan lifter, showing the same in use, the pan being shown in section.

Figure 2 is a top plan view of my improved lifter in use, only a fragment of the pan being shown and parts of the same being in section.

Figure 3 is a horizontal section taken on the line 3—3 of Figure 1 looking in the direction of the arrows.

Figure 4 is a detail perspective view illustrating the supporting plate for engaging under the pan and the steadying arm arranged adjacent to the pan.

Figure 5 is a fragmentary detail perspective view showing the steadying arm or plates carried by the upper crossed handle.

Referring to the drawings in detail, wherein similar reference characters designate corresponding parts throughout the several views, the letter A generally indicates my improved device and B a pan with which the same can be used.

The pan is of ordinary or any preferred character and has simply been illustrated to show the use of my improved lifter and this pan is of the type generally employed for baking rolls or bread and includes the flat bottom wall 10 and the side and end walls 11. As shown, the upper edges of the end walls are rolled to provide a reinforcing bead 12.

My improved hot pan lifter comprises a pair of crossed handles 15 and 16, the rear ends of which are provided with finger and thumb grips 17 and 18 respectively. The handles 15 and 16 are pivotally connected together at their point of crossing by means of a pivot pin or bolt 19. I also preferably use a U-shaped clip 20 at this point through which extends the pivot pin for bracing the handles at their point of crossing. The handle 15 preferably includes a pair of handle bars 20 which gradually diverge toward their forward ends and the forward terminals of these handle bars 20 are provided with depending feet defining pan engaging hooks 21. The handle 16 also preferably includes a pair of handle bars 22, which likewise diverge toward their forward ends and these handle bars 22 have connected to their outer ends angle brackets 23 to which is connected a depending channel shaped reinforcing bar 24. Projecting forwardly from the lower end of the U-shaped reinforcing bar 24 is a flat plate 25 which is adapted to engage under the pan being lifted.

As clearly shown in Figures 1 and 2 of the drawings, the handle bars 22 of the handle 16 extend between the handle bars 20 of the handle 15 at the point of crossing of the handles, which presents a durable and efficient structure.

From the construction so far, it can be seen that the forward terminals of the handle bars 22 of the handle 16 carry a flat supporting plate 25 for engaging under the pan B while the forward terminals of the handle bars 20 of the handle 16 carry hooks 21 for engaging over the upper edge of the pan.

One of the important features of my invention is the provision of novel means carried by the handles for engaging the outer surface of the pan to hold the same steady against swinging movement while the pan is being lifted so as to preclude the pan from slipping out of the handle incident to the carrying of said pan. Thus the handle bars 22 of the handle 16 carry forward projecting angle brackets 26 which are secured to the reinforcing channel bar 24 at the point of connection of the angle bracket 23 therewith. Extending laterally in opposite directions from the angle brackets 26 are the steadying arms 27 which extend at right angles to the supporting plate 25 and these arms are in the nature of flat strips for engaging the outer face of the pan. The channel bar 24 provides means for holding the forward terminals of the handle bars 22 in proper spaced relation and the handle bar 20 of the handle 15 adjacent to their forward ends are held in proper spaced relation by means of a spacing bolt 30. This bolt 30 carries the forwardly and downwardly extending clip 31 to the front face of which is riveted or otherwise secured a substantially U-shaped supporting bracket 32. This bracket 32 has formed on the end thereof outwardly extending arms 33 to which is riveted or otherwise secured the transversely extending steadying strip 35. It is to be noted that this steadying strip 35 is arranged below and in rear of the hooks 21 and thus the strip is adapted to engage the outer surface of the pan B directly in rear of and slightly below the hooks. Where a pan is provided with a rolled bead 12, the strip 35 engages under the bead and forms an additional means for grasping the pan.

From the foregoing description, it can be seen that I have provided a novel device of exceptionally simple and durable character for effectively handling hot pans without danger to the operator.

Changes in details may be made without departing from the spirit or the scope of this invention, but what I claim as new is:

A device for handling hot pans comprising a pair of pivotally connected cross handles, each of said handles including spaced handle bars diverging toward the forward ends, the handle bars of one handle being provided with depending hooks, for engaging over the upper edge of the pan to be lifted, a transversely extending brace rod connected to the forward end of the handle bars of the other handle, a forwardly projecting flat supporting plate connected to said bar for engaging under the pan to be lifted, and steadying arms and strips carried by the handle bars of both handles for engaging the outer face of the pan to be lifted.

In testimony whereof I affix my signature.

WILLIAM MATHEW MOORE.